(12) United States Patent
Obayashi et al.

(10) Patent No.: US 7,749,938 B2
(45) Date of Patent: Jul. 6, 2010

(54) CATALYST FOR NITROGEN OXIDE REMOVAL AND EXHAUST GAS TREATMENT METHOD

(75) Inventors: Yoshiaki Obayashi, Hiroshima (JP); Akira Hattori, Nagasaki (JP); Masanori Demoto, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 11/902,190

(22) Filed: Sep. 19, 2007

(65) Prior Publication Data

US 2008/0112871 A1    May 15, 2008

(30) Foreign Application Priority Data

Nov. 15, 2006    (JP) .............................. 2006-308747

(51) Int. Cl.
*B01J 23/00* (2006.01)

(52) U.S. Cl. ....................... 502/312; 502/309; 502/319; 502/321; 502/350; 423/239.1; 423/237; 422/177; 422/170

(58) Field of Classification Search ................. None
See application file for complete search history.

(56) References Cited

U.S. PATENT DOCUMENTS

2005/0137082 A1 *   6/2005   Nojima et al. .............. 502/312

FOREIGN PATENT DOCUMENTS

| JP | 04-018932 | * | 1/1992 |
| JP | 10-118492 | A | 5/1998 |
| JP | 2004-330179 | A | 11/2004 |

OTHER PUBLICATIONS

JP04-018932, (translation done in english), Japan, Jan. 1992, Kozo et al.*

Wallin et al., Screening of TiO2- Supported Catalysts for Selective NOx Reduction with Ammonia, Ind. Eng. Chem. Res. vol. 43, No. 24, 2004, pp. 7723-7731.

* cited by examiner

*Primary Examiner*—Melvin C Mayes
*Assistant Examiner*—Smita Patel
(74) *Attorney, Agent, or Firm*—Birch, Stewart, Kolasch & Birch, LLP

(57) ABSTRACT

A catalyst for nitrogen oxide removal, which catalytically reduces nitrogen oxides in an exhaust gas in the presence of ammonia, comprises: a first component comprising an oxide of titanium, an oxide of tungsten, and an oxide of vanadium; and a second component comprising an oxide of manganese, or an oxide of manganese and an oxide of copper.

10 Claims, 4 Drawing Sheets

CATALYST FOR NITROGEN OXIDE REMOVAL AND EXHAUST GAS TREATMENT METHOD

BACKGROUND OF THE INVENTION

1. Field of the Invention

This invention relates to a catalyst for nitrogen oxide removal, which removes nitrogen oxides ($NO_x$) in an exhaust gas discharged from a boiler or the like, and an exhaust gas treatment method. More specifically, the invention relates to a catalyst for nitrogen oxide removal, which is useful in treating an exhaust gas having a high proportion of nitrogen dioxide to nitrogen oxides, and an exhaust gas treatment method.

2. Description of the Related Art

An exhaust gas discharged from a boiler or the like contains nitrogen oxides ($NO_x$), and most of (90% or more) of the nitrogen oxides are present as nitrogen monoxide (NO). As a denitration method for such an exhaust gas, practical use is made of an ammonia catalytic reduction process by which ammonia ($NH_3$), as a reducing agent, is poured into (added to) the exhaust gas, and this exhaust gas is brought into contact with a catalyst having vanadium oxide and tungsten oxide supported on a titania carrier, whereby NOx is decomposed into harmless nitrogen and water.

With an exhaust gas from a gas turbine, a diesel engine, a gas engine, or a chemical plant such as a nitric acid plant, which greatly changes in load, however, there is a case where the proportion of nitrogen dioxide ($NO_2$) is higher than the proportion of NO. In treating such an exhaust gas, the treatment of the exhaust gas with the above-mentioned conventional catalyst results in a decreased denitration rate.

Various catalysts containing chromium have been proposed as catalysts showing sufficient denitration performance even for an exhaust gas having a higher proportion of $NO_2$ than the proportion of NO as stated above (see, for example, Japanese Unexamined Patent Publication No. 1998-118492).

However, the above-mentioned catalyst has sufficient denitration performance for an exhaust gas having a higher proportion of $NO_2$ than the proportion of NO, but there is a concern about chromium contained in this catalyst. Thus, a demand for a chromium-free catalyst is expressed.

The present invention has been proposed in light of the above-described circumstances. It is an object of the invention to provide a catalyst for nitrogen oxide removal which can show sufficient denitration performance for an exhaust gas having a higher proportion of $NO_2$ than the proportion of NO, although the catalyst contains no chromium, and to provide an exhaust gas treatment method.

SUMMARY OF THE INVENTION

A first aspect of the present invention is a catalyst for nitrogen oxide removal which catalytically reduces nitrogen oxides in an exhaust gas in the presence of ammonia, the catalyst comprising: a first component comprising an oxide of titanium, an oxide of tungsten, and an oxide of vanadium; and a second component comprising an oxide of manganese, or an oxide of manganese and an oxide of copper.

An example of the exhaust gas is an exhaust gas discharged from a gas turbine, a diesel engine, a gas engine, or a chemical plant such as a nitric acid plant.

A second aspect of the present invention is the catalyst for nitrogen oxide removal according to the first aspect, prepared by impregnating a base material comprising the first component with the second component and carrying the second component on the base material, drying, and then firing the base material impregnated with and bearing the second component.

A third aspect of the present invention is the catalyst for nitrogen oxide removal according to the first aspect, prepared by adding a solvent to the first component and the second component, kneading, drying, and then firing the resulting mixture.

A fourth aspect of the present invention is the catalyst for nitrogen oxide removal according to the first aspect, wherein the proportions of the oxide of tungsten and the oxide of vanadium are 3 parts by weight or more, but 25 parts by weight or less and 0.1 part by weight or more, but 6 parts by weight or less, respectively, per 100 parts by weight of the oxide of titanium.

A fifth aspect of the present invention is the catalyst for nitrogen oxide removal according to the first aspect, wherein the proportion of the second component is 0.15 part by weight or more, but 4.5 parts by weight or less based on the first component.

A sixth aspect of the present invention is the catalyst for nitrogen oxide removal according to the first aspect, wherein the weight ratio between the oxide of manganese and the oxide of copper is 100:0 to 100:100.

A seventh aspect of the present invention is an exhaust gas treatment method for removing nitrogen oxides contained in an exhaust gas, comprising bringing the exhaust gas, to which ammonia has been added, into contact with the catalyst for nitrogen oxide removal according to the first aspect, thereby reducing the nitrogen oxides.

An eighth aspect of the present invention is the exhaust gas treatment method according to the seventh aspect, wherein the ratio of nitrogen dioxide to the nitrogen oxides in the exhaust gas is 0.5 or higher.

A ninth aspect of the present invention is the exhaust gas treatment method according to the seventh aspect, further comprising bringing the exhaust gas, which has passed through the catalyst for nitrogen oxide removal, into contact with a denitration catalyst, thereby further reducing the nitrogen oxides.

As described above, the catalyst for nitrogen oxide removal according to the present invention comprises the first component comprising the oxide of titanium, the oxide of tungsten, and the oxide of vanadium, and the second component comprising the oxide of manganese, or the oxide of manganese and the oxide of copper. Thus, even if the proportion of nitrogen dioxide to the nitrogen oxides in the exhaust gas is high, the nitrogen oxides can be decomposed into harmless nitrogen and water upon reduction. In this manner, the nitrogen oxides can be fully denitrated. Furthermore, the catalyst for nitrogen oxide removal is free from chromium, thus arousing no concern about chromium.

On the other hand, the exhaust gas treatment method according to the present invention ensures reliable contact between the catalyst for nitrogen oxide removal and the exhaust gas having ammonia added thereto. Thus, even if the proportion of nitrogen dioxide to the nitrogen oxides in the exhaust gas is high, the nitrogen oxides can be decomposed into harmless nitrogen and water upon reduction. In this manner, the nitrogen oxides can be fully denitrated.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The catalyst for nitrogen oxide removal, and the exhaust gas treatment method according to the present invention will be described in detail by the best mode of the present invention with reference to the accompanying drawings.

Figure 1:
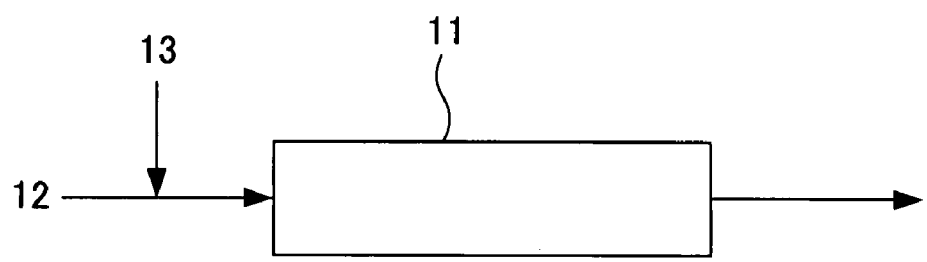
FIG. 1 is a schematic view showing an exhaust gas treatment method according to an embodiment of the present invention.
Figure 2:
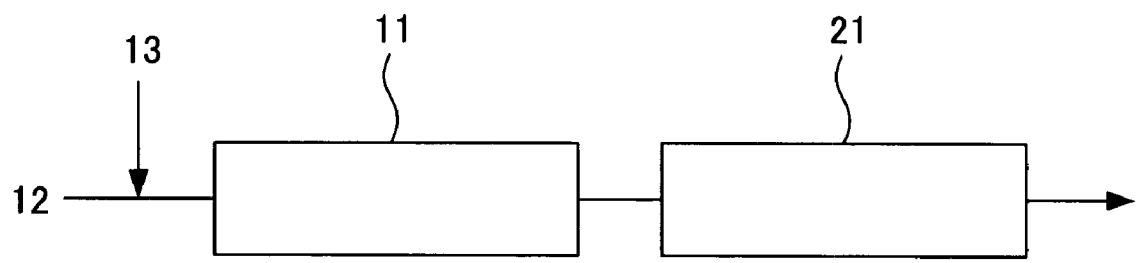
FIG. 2 is a schematic view showing an exhaust gas treatment method according to another embodiment of the present invention.

FIG. 1 is a schematic view showing the exhaust gas treatment method according to an embodiment of the present invention. FIG. 2 is a schematic view showing the exhaust gas treatment method according to another embodiment of the present invention.

The catalyst for nitrogen oxide removal according to the best mode of the present invention is a catalyst for nitrogen oxide removal which catalytically reduces nitrogen oxides in an exhaust gas in the presence of ammonia, the catalyst comprising a first component comprising an oxide of titanium, an oxide of tungsten and an oxide of vanadium, and a second component comprising an oxide of manganese, or an oxide of manganese and an oxide of copper. When ammonia ($NH_3$) is added to an exhaust gas discharged from a gas turbine, a diesel engine, a gas engine, or a chemical plant such as a nitric acid plant, which undergoes great changes in load, and the resulting mixture is contacted with such a catalyst for nitrogen oxide removal comprising the above components, the catalyst can reduce nitrogen oxides and decompose them into harmless nitrogen and water.

The above-mentioned catalyst for nitrogen oxide removal can be obtained by impregnating a base material comprising the first component with the second component and firing the impregnation product after drying, or by adding a solvent to the first component and the second component, and kneading, drying, and then firing the mixture.

Since the above-mentioned catalyst for nitrogen oxide removal contains the second component, nitrogen oxides in the exhaust gas can be reduced in the presence of ammonia, and decomposed into harmless nitrogen and water, even when the proportion of nitrogen dioxide to the nitrogen oxides in the exhaust gas is high.

If the second component comprises an oxide of manganese and an oxide of copper, the weight ratio between the oxide of manganese and the oxide of copper is set at 100:0 to 100:100. By selecting such a weight ratio, nitrogen oxides in the exhaust gas can be reliably reduced in the presence of ammonia, and decomposed into harmless nitrogen and water, even when the proportion of nitrogen dioxide to the nitrogen oxides in the exhaust gas is high.

The proportions of the oxide of tungsten and the oxide of vanadium are set at 3 parts by weight or more, but 25 parts by weight or less and 0.1 part by weight or more, but 6 parts by weight or less, respectively, per 100 parts by weight of the oxide of titanium. By selecting such proportions by weight, nitrogen monoxide in the exhaust gas can be denitrated sufficiently.

The proportion of the second component is set at 0.15 part by weight or more, but 4.5 parts by weight or less based on the first component. By selecting such a proportion by weight, the reduction reaction of nitrogen monoxide and the reduction reaction of nitrogen dioxide can be promoted in a well-balanced manner, whereby nitrogen oxides in the exhaust gas can be removed efficiently.

As described above, the catalyst for nitrogen oxide removal is suitably used when the proportion of nitrogen dioxide to nitrogen oxides in the exhaust gas. It is suitably used particularly in the treatment of the exhaust gas in which the ratio of nitrogen dioxide to nitrogen oxides in the exhaust gas is 0.5 or more, namely, the concentration of nitrogen dioxide is higher than the concentration of nitrogen monoxide.

As described above, the catalyst for nitrogen oxide removal comprises the first component comprising the oxide of titanium, the oxide of tungsten and the oxide of vanadium, and the second component comprising the oxide of manganese, or the oxide of manganese and the oxide of copper. Thus, even if the proportion of nitrogen dioxide to the nitrogen oxides in the exhaust gas is high, the nitrogen oxides can be decomposed into harmless nitrogen and water upon reduction. In this manner, the nitrogen oxides can be fully denitrated. Furthermore, the catalyst for nitrogen oxide removal is chromium-free, thus arousing no concern about chromium.

The exhaust gas treatment method according to the present invention is, for example, a method in which an exhaust gas 12 having ammonia. ($NH_3$) 13 added thereto is brought into contact only with a catalyst 11 for nitrogen oxide removal, as shown in FIG. 1. Alternatively, the method is exemplified by a method in which the exhaust gas 12 having ammonia ($NH_3$) 13 added thereto is brought into contact with the catalyst 11 for nitrogen oxide removal, and then the exhaust gas having passed through the catalyst 11 is brought into contact with a denitration catalyst 21, as shown in FIG. 2. An example of the denitration catalyst 21 is a catalyst conventionally used, such as a catalyst comprising an oxide of titanium, an oxide of vanadium and an oxide of tungsten.

With the exhaust gas treatment method shown in FIG. 1, the catalyst 11 for nitrogen oxide removal can reduce nitrogen oxides in the exhaust gas 12 to decompose them into harmless nitrogen and water, even when the proportion of nitrogen dioxide to the nitrogen oxides in the exhaust gas 12 is high.

With the exhaust gas treatment method shown in FIG. 2, the catalyst 11 for nitrogen oxide removal and the denitration catalyst 21 can reduce nitrogen oxides in the exhaust gas 12 to decompose them into harmless nitrogen and water, even when the proportion of nitrogen dioxide to the nitrogen oxides in the exhaust gas 12 is high. Furthermore, the denitration catalyst 21 can reliably denitrate nitrogen monoxide in the exhaust gas 12. That is, compared with the exhaust gas treatment method relying only on the catalyst 11 for nitrogen oxide removal, the exhaust gas treatment method using both of the catalyst 11 for nitrogen oxide removal and the denitration catalyst 21 can remove nitrogen monoxide in the exhaust gas 12 more efficiently, and can reduce the cost for treatment.

EXAMPLE 1

The catalyst 11 for nitrogen oxide removal described above will be explained more concretely.

Catalyst Preparation Method 1:

A honeycomb catalyst (pitch 3.3 mm, wall thickness 0.5 mm) containing 10 parts by weight of tungsten oxide ($WO_3$) and 4 parts by weight of vanadium oxide ($V_2O_5$) per 100 parts by weight of titania ($TiO_2$) was soaked in a solution containing manganese nitrate ($Mn(NO_3)_2$) and copper nitrate ($Cu(NO_3)_3 \cdot 3H_2O$), whereby the catalyst was impregnated with and carried manganese oxide and copper oxide such that the sum of the amounts of manganese oxide and copper oxide was 1.5 parts by weight per 100 parts by weight of a combination of titania, tungsten oxide and vanadium oxide. In order to set the sum of the amounts of manganese oxide and copper oxide, impregnated and carried, at 1.5 parts by weight per 100 parts by weight of the titania-tungsten oxide-vanadium oxide catalyst when the water content of the titania-tungsten oxide-vanadium oxide catalyst was 0.25 mL per gram of the catalyst, for example, the concentrations of manganese nitrate and copper nitrate in the solution were calculated as follows:

$$Mn_2O_3 \ (\%) = 1.5\% \times \frac{157.8}{157.8 + 79.5} = 0.997\%$$

$$CuO \ (\%) = 1.5\% \times \frac{79.5}{157.8 + 79.5} = 0.503\%$$

where the molecular weight of $Mn_2O_3$ was taken as 157.8, and the molecular weight of CuO was taken as 79.5.

$$0.00997 \times \frac{1}{0.25} \times \frac{2 \times 178.9}{157.8} = 0.0904 \ g/mL = 90.4 \ g/L$$

$$0.00503 \times \frac{1}{0.25} \times \frac{241.5}{79.5} = 0.611 \ g/mL = 61.1 \ g/L$$

where the molecular weight of $Mn(NO_3)_2$ was taken as 178.9, and the molecular weight of $Cu(NO_3)_3 \cdot 3H_2O$ was taken as 241.5.

Thus, 90.4 g of manganese nitrate and 61.1 g of copper nitrate were dissolved in water, the resulting solution was adjusted to 1 L, and the above-mentioned titania-tungsten oxide-vanadium oxide catalyst was soaked in the solution for 1 minute, whereby 100 parts by weight of the catalyst were impregnated with 1.5 parts by weight of manganese oxide and copper oxide put together.

Then, the titania-tungsten oxide-vanadium oxide catalyst having manganese oxide and copper oxide carried thereon was dried, and then fired at 400° C. for 5 hours. The resulting catalyst was designated as honeycomb catalyst (No. 1).

EXAMPLE 2

Catalyst Preparation Method 2:

An explanation will be offered for honeycomb catalyst (No. 2) having only manganese oxide impregnated and carried on the above-mentioned titania-tungsten oxide-vanadium oxide catalyst.

A honeycomb catalyst (pitch 3.3 mm, wall thickness 0.5 mm) containing 10 parts by weight of tungsten oxide ($WO_3$) and 4 parts by weight of vanadium oxide per 100 parts by weight of titania ($TiO_2$) was soaked in a solution containing manganese nitrate, whereby the catalyst was impregnated with and carried manganese oxide such that the amount of manganese oxide was 1.5 parts by weight per 100 parts by weight of a combination of titania, tungsten oxide and vanadium oxide. In order to set the amount of manganese oxide, impregnated and carried, at 1.5 parts by weight per 100 parts by weight of the titania-tungsten oxide-vanadium oxide catalyst when the water content of the titania-tungsten oxide-vanadium oxide catalyst was 0.25 mL per gram of the catalyst, for example, the concentration of manganese nitrate was calculated as follows:

$$0.015 \times \frac{1}{0.25} \times \frac{2 \times 178.9}{157.8} = 0.1360 \ g/mL = 136.0 \ g/L$$

Thus, 136.0 g of manganese nitrate was dissolved in water, the resulting solution was adjusted to 1 L, and the above-mentioned titania-tungsten oxide-vanadium oxide catalyst was soaked in the solution for 1 minute, whereby 100 parts by weight of the catalyst were impregnated with 1.5 parts by weight of manganese oxide.

Then, the titania-tungsten oxide-vanadium oxide catalyst having manganese oxide carried thereon was dried, and then fired at 400° C. for 5 hours. The resulting catalyst was designated as honeycomb catalyst (No. 2).

EXAMPLE 3

Catalyst Preparation Method 3:

An explanation will be offered for honeycomb catalyst (No. 3) comprising titania, tungsten oxide, vanadium oxide, manganese oxide and copper oxide.

A methylamine solution of ammonium metavanadate ($NH_4VO_3$) and ammonium paratungstate ($(NH_4)_{10}W_{12}O_{41} \cdot 5H_2O$) was added to an anatase type titania ($TiO_2$) powder, and the mixture was kneaded by a kneader to obtain a kneadate containing 10 parts by weight of tungsten oxide ($WO_3$) and 4 parts by weight of vanadium oxide ($V_2O_5$) per 100 parts by weight of titania ($TiO_2$).

To the kneadate, an aqueous solution of manganese nitrate ($Mn(NO_3)_2$) and copper nitrate ($Cu(NO_3)_3 \cdot 3H_2O$) was further added, and the mixture was kneaded by a kneader to obtain a kneadate containing 0.997 part by weight of manganese oxide and 0.503 part by weight of copper oxide per 100 parts by weight of titania-tungsten oxide-vanadium oxide. To this kneadate, there were added clay as an inorganic binder, glass fibers as inorganic fibers, and cellulose acetate as an organic binder. The mixture was kneaded, and formed into a honeycomb shape (pitch 3.3 mm, wall thickness 0.5 mm) by an extruder.

After forming, the honeycomb-shaped material was dried, and fired for 5 hours at 400° C. to remove the organic binder. The resulting catalyst was designated as honeycomb catalyst (No. 3).

EXAMPLE 4

Catalyst Preparation Method 4:

An explanation will be offered for honeycomb catalyst (No. 4) comprising titania, tungsten oxide, vanadium oxide, manganese oxide and copper oxide.

A honeycomb catalyst (pitch 3.3 mm, wall thickness 0.5 mm) containing 10 parts by weight of tungsten oxide ($WO_3$) and 4 parts by weight of vanadium oxide ($V_2O_5$) per 100 parts by weight of titania ($TiO_2$) was soaked in a solution containing manganese nitrate ($Mn(NO_3)_2$) and copper nitrate (Cu ($NO_3)_3 \cdot 3H_2O$), whereby the catalyst was impregnated with and carried manganese oxide and copper oxide such that the sum of the amounts of manganese oxide and copper oxide was 0.15 part by weight per 100 parts by weight of a combination of titania, tungsten oxide and vanadium oxide. In order to set the sum of the amounts of manganese oxide and copper oxide, impregnated and carried, at 0.15 part by weight per 100 parts by weight of the titania-tungsten oxide-vanadium oxide catalyst when the water content of the titania-tungsten oxide-vanadium oxide catalyst was 0.25 mL per gram of the catalyst, for example, the concentrations of manganese nitrate and copper nitrate in the solution were calculated in the same manner as in the Catalyst preparation method 1.

Thus, 9.04 g of manganese nitrate and 6.11 g of copper nitrate were dissolved in water, the resulting solution was adjusted to 1 L, and the above-mentioned titania-tungsten oxide-vanadium oxide catalyst was soaked in the solution for 1 minute, whereby 100 parts by weight of the catalyst were impregnated with 0.15 part by weight of manganese oxide and copper oxide put together.

Then, the titania-tungsten oxide-vanadium oxide catalyst having manganese oxide and copper oxide carried thereon was dried, and then fired at 400° C. for 5 hours. The resulting catalyst was designated as honeycomb catalyst (No. 4).

EXAMPLE 5

Catalyst Preparation Method 5:

An explanation will be offered for honeycomb catalyst (No. 5) comprising titania, tungsten oxide, vanadium oxide, manganese oxide and copper oxide.

A honeycomb catalyst (pitch 3.3 mm, wall thickness 0.5 mm) containing 10 parts by weight of tungsten oxide ($WO_3$) and 4 parts by weight of vanadium oxide ($V_2O_5$) per 100 parts by weight of titania ($TiO_2$) was soaked in a solution containing manganese nitrate ($Mn(NO_3)_2$) and copper nitrate ($Cu(NO_3)_3 \cdot 3H_2O$), whereby the catalyst was impregnated with and carried manganese oxide and copper oxide such that the sum of the amounts of manganese oxide and copper oxide was 4.5 parts by weight per 100 parts by weight of a combination of titania, tungsten oxide and vanadium oxide. In order to set the sum of the amounts of manganese oxide and copper oxide, impregnated and carried, at 4.5 parts by weight per 100 parts by weight of the titania-tungsten oxide-vanadium oxide catalyst when the water content of the titania-tungsten oxide-vanadium oxide catalyst was 0.25 mL per gram of the catalyst, for example, the concentrations of manganese nitrate and copper nitrate in the solution were calculated in the same manner as in the Catalyst preparation method 1.

Thus, 271.2 g of manganese nitrate and 183.3 g of copper nitrate were dissolved in water, the resulting solution was adjusted to 1 L, and the above-mentioned titania-tungsten oxide-vanadium oxide catalyst was soaked in the solution for 1 minute, whereby 100 parts by weight of the catalyst were impregnated with 4.5 parts by weight of manganese oxide and copper oxide put together.

Then, the titania-tungsten oxide-vanadium oxide catalyst having manganese oxide and copper oxide carried thereon was dried, and then fired at 400° C. for 5 hours. The resulting catalyst was designated as honeycomb catalyst (No. 5).

EXAMPLE 6

Catalyst Preparation Method 6:

An explanation will be offered for honeycomb catalyst (No. 6) comprising titania, tungsten oxide, vanadium oxide, manganese oxide and copper oxide.

Impregnation, drying and firing operations were repeated twice using the solution of manganese nitrate and copper nitrate prepared by the Catalyst preparation method 5. As a result, a catalyst having 100 parts by weight of the aforementioned titania-tungsten oxide-vanadium oxide impregnated with 9.0 parts by weight of manganese oxide and copper oxide put together was obtained. The resulting catalyst was designated as honeycomb catalyst (No. 6).

COMPARATIVE EXAMPLE 1

Comparative Catalyst Preparation Method 1:

A honeycomb catalyst (pitch 3.3 mm, wall thickness 0.5 mm) containing 10 parts by weight of tungsten oxide ($WO_3$) and 4 parts by weight of vanadium oxide ($V_2O_5$) per 100 parts by weight of titania ($TiO_2$) was adopted as comparative honeycomb catalyst (No. 1).

Evaluation Experiments:

Denitration Performance Evaluation 1

An exhaust gas was passed through each of the above-described honeycomb catalysts (No. 1 and No. 2) and comparative honeycomb catalyst (No. 1) under the conditions shown in Table 1, and the denitration performance of each catalyst was measured. In Table 1, AV denotes areal velocity (amount of gas/total contact area in catalyst).

TABLE 1

| Gas temperature | 287° C. |
|---|---|
| Gas flow velocity | 2.1 $m^3$N/sec |
| AV | 8.69 $Nm^3/m^2 \cdot hr$ |
| Gas properties | $O_2$: 15.2% |
| | NO: 10 ppm |
| | $NO_2$: 20 ppm |
| | $NO_2/NO_x$: 0.67 |
| | $NH_3/NO_x$ ratio: 0.83→1.2 |

Figure 3:
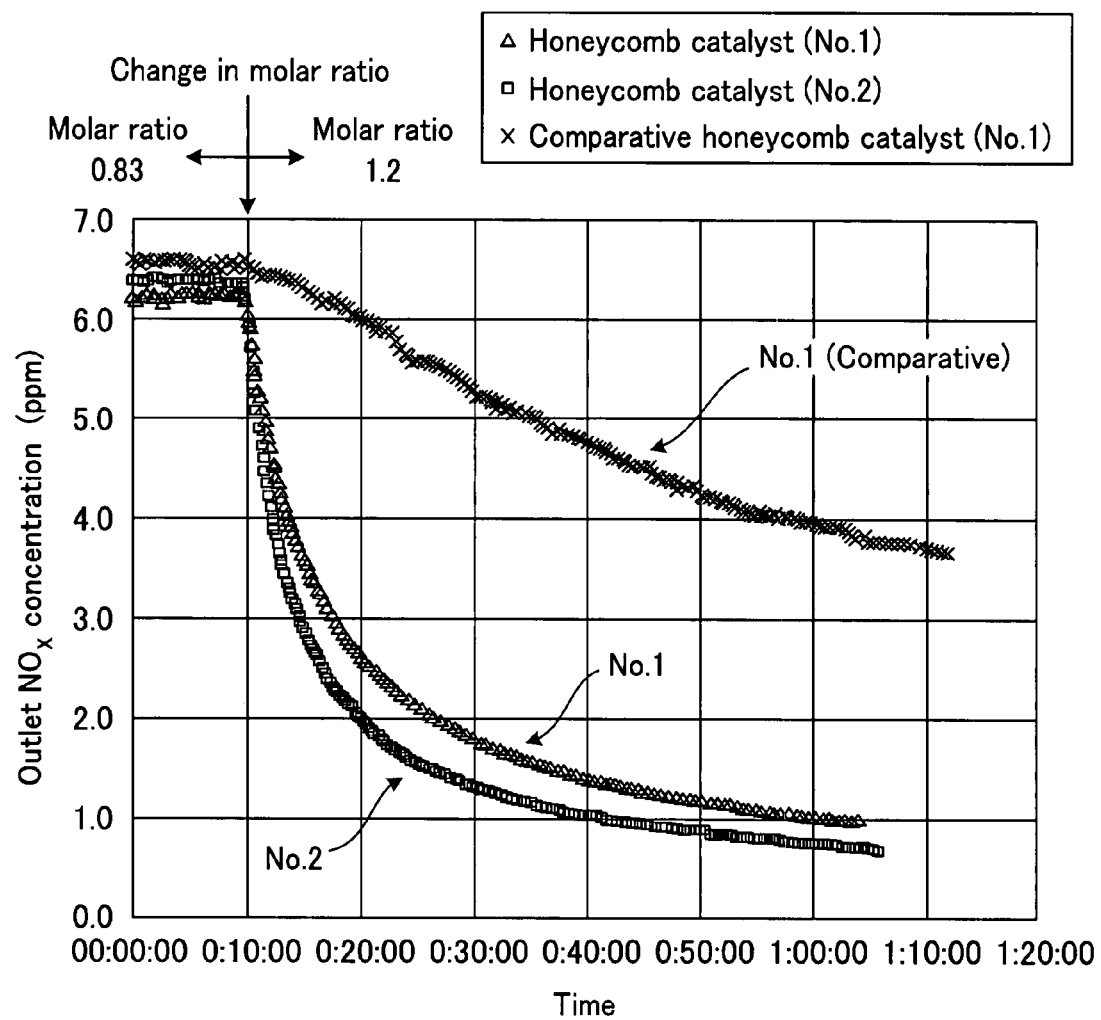
FIG. 3 is a graph showing the concentrations of $NO_X$ at the outlet upon addition of ammonia to catalysts for nitrogen oxide removal according to the present invention.

The results of measurements under the conditions shown in Table 1 are shown in FIG. 3. In this drawing, the triangle denotes the aforementioned honeycomb catalyst (No. 1), the square denotes the aforementioned honeycomb catalyst (No. 2), and the cross denotes the aforementioned comparative honeycomb catalyst (No. 1). The ordinate represents the concentration (ppm) of $NO_X$ at the outlet, and the abscissa represents the elapsed time.

As shown in FIG. 3, with the honeycomb catalyst (No. 1) and the honeycomb catalyst (No. 2), when the amount of ammonia poured was increased to change the $NH_3/NO_X$ ratio, the $NO_X$ concentration at the outlet sharply decreased and, with the increase in the elapsed time, further decreased gradually, coming to 3 ppm or less in about 18 minutes and about 15 minutes, respectively. With the comparative honeycomb catalyst (No. 1), on the other hand, when the amount of ammonia poured was increased to change the $NH_3/NO_X$ ratio, the $NO_X$ concentration at the outlet gradually decreased with the increase in the elapsed time, but even after a lapse of 50 minutes, the $NO_X$ concentration at the outlet decreased to about 4.0 ppm only.

Thus, even when the proportion of $NO_2$ to $NO_X$ was high, the aforementioned honeycomb catalysts (No. 1 and No. 2) were able to decrease the $NO_X$ concentration at the outlet in a short time (were quick in response), in comparison with the aforementioned comparative honeycomb catalyst (No. 1). Accordingly, the honeycomb catalysts (No. 1 and No. 2) were found to be very useful as objects for treating an exhaust gas having the above-described properties.

Denitration Performance Evaluation 2

An exhaust gas was passed through each of the above-described honeycomb catalysts (No. 4 to No. 6) under the conditions shown in Table 1, and the denitration performance of each catalyst was measured.

Figure 4:
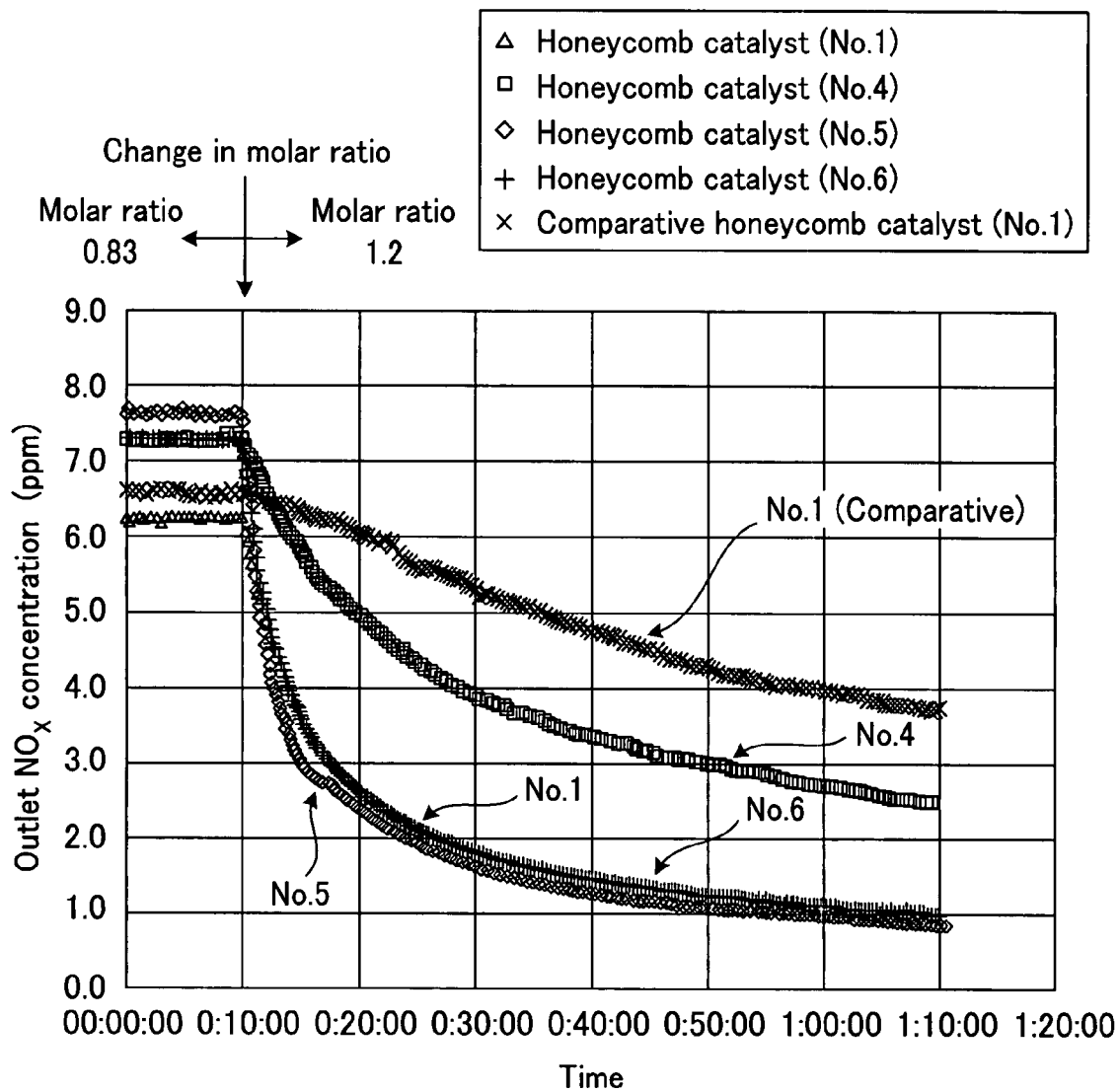
FIG. 4 is a graph showing the concentrations of $NO_X$ at the outlet upon addition of ammonia to catalysts for nitrogen oxide removal according to the present invention.

The results of measurements under the conditions shown in Table 1 are shown in FIG. 4. In this drawing, the triangle denotes the aforementioned honeycomb catalyst (No. 1), the square denotes the aforementioned honeycomb catalyst (No. 4), the rhombus denotes the aforementioned honeycomb catalyst (No. 5), the plus denotes the aforementioned honeycomb catalyst (No. 6), and the cross denotes the aforementioned comparative honeycomb catalyst (No. 1). The ordinate represents the concentration (ppm) of $NO_X$ at the outlet, and the abscissa represents the elapsed time.

As shown in FIG. 4, with the honeycomb catalyst (No. 4), when the amount of ammonia poured was increased to change the $NH_3/NO_X$ ratio, the $NO_X$ concentration at the outlet decreased and, with the increase in the elapsed time, came to 3 ppm or less in about 50 minutes. With the honeycomb catalyst (No. 5) and the honeycomb catalyst (No. 6), when the amount of ammonia poured was increased to change the $NH_3/NO_X$ ratio, the $NO_X$ concentration at the outlet abruptly decreased and, coming to 3 ppm or less within about 15 minutes and about 17 minutes, respectively.

Thus, even when the proportion of $NO_2$ to $NO_X$ was high, the aforementioned honeycomb catalyst (No. 4) was able to decrease the $NO_X$ concentration at the outlet in a short time (was quick in response), in comparison with the aforementioned comparative honeycomb catalyst (No. 1). Furthermore, by increasing the concentration of the second component as in the honeycomb catalyst (No. 5) and the honeycomb catalyst (No. 6), it was found that the $NO_X$ concentration at the outlet could be decreased in a shorter time.

However, it was also found that even when the sum of the concentrations of manganese oxide and copper oxide, as the concentration of the second component, exceeded 4.5 parts by weight per 100 parts by weight of titania-tungsten oxide-vanadium oxide, this showed no effect in shortening the time for decreasing the $NO_X$ concentration at the outlet.

Evaluation of Steady-State Denitration Performance

An exhaust gas was passed through each of the aforementioned honeycomb catalyst (No. 2) and comparative honeycomb catalyst (No. 1) under the conditions shown in Table 2, and the steady-state denitration performance of each catalyst was measured. In Table 2, Ugs denotes superficial velocity (flow rate of fluid/sectional area of flow path).

TABLE 2

| | |
|---|---|
| Ugs | 2.0 Nm/s |
| AV | 16.55 $Nm^3/m^2 \cdot hr$ |
| Gas properties | $O_2$: 15.2% |
| | NO: 10 ppm |
| | $NO_2$: 40 ppm |
| | $NO_2/NO_x$: 0.8 |
| | $NH_3/NO_x$ ratio: 1.0 |

Figure 5:
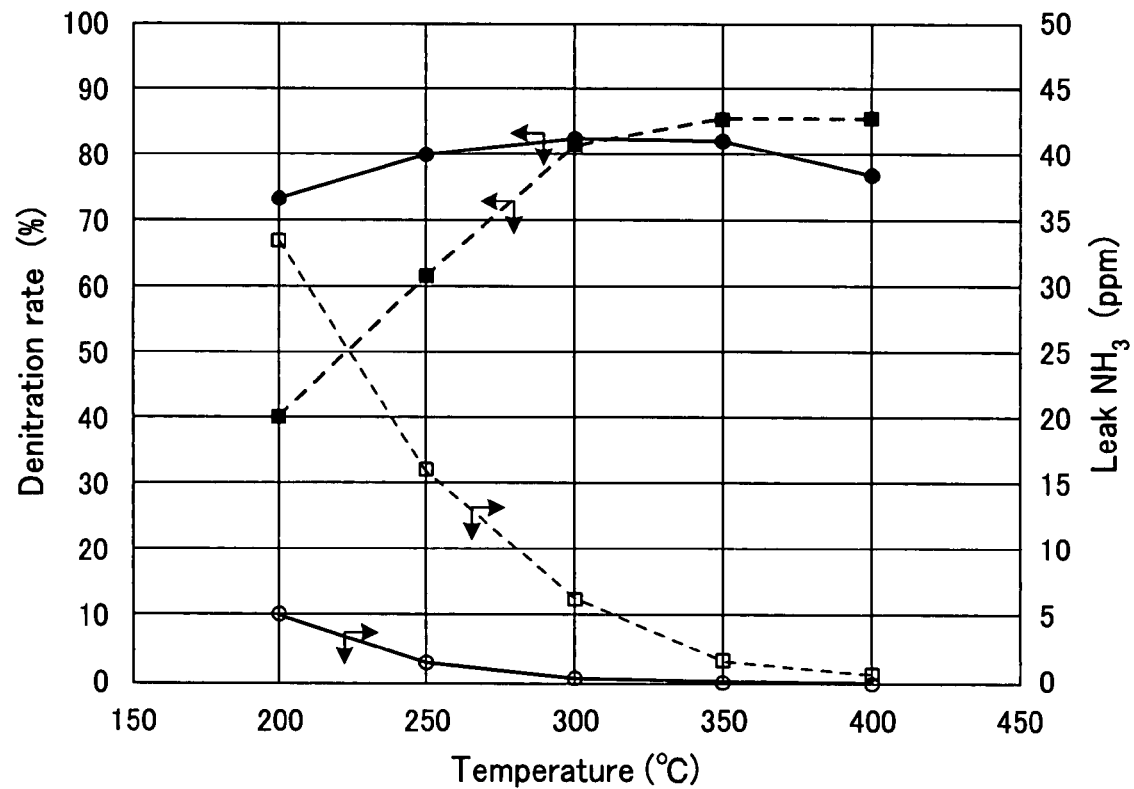
FIG. 5 is a graph showing the relationship between the temperature of an exhaust gas and the denitration rate or the ammonia concentration at the outlet in the catalyst for nitrogen oxide removal according to the present invention.

The results of measurements under the conditions shown in Table 2 are shown in FIG. 5. In this drawing, the solid circle represents the relationship between the exhaust gas temperature and the denitration rate in the aforementioned honeycomb catalyst (No. 2), the open circle represents the relationship between the exhaust gas temperature and the ammonia concentration at the outlet of the catalyst in the aforementioned honeycomb catalyst (No. 2), the solid square represents the relationship between the exhaust gas temperature and the denitration rate in the aforementioned comparative honeycomb catalyst (No. 1), and the open square represents the relationship between the exhaust gas temperature and the ammonia concentration at the outlet of the catalyst in the aforementioned comparative honeycomb catalyst (No. 1). The right ordinate represents the ammonia concentration at the outlet of the catalyst, the left ordinate represents the denitration rate, and the abscissa represents the exhaust gas temperature.

As shown in FIG. 5, in the exhaust gas temperature region ranging from 300° C. to 350° C., each of the aforementioned honeycomb catalyst (No. 2) and the aforementioned comparative honeycomb catalyst (No. 1) attained an ammonia concentration at the catalyst outlet of 7 ppm or less, and a high denitration rate of 80% or more. At the exhaust gas temperature of 200° C. which was lower than 300° C., the aforementioned honeycomb catalyst (No. 2) attained an ammonia concentration at the catalyst outlet of 5 ppm or less, and a denitration rate of as high as 70% or more. At the same temperature, on the other hand, the aforementioned comparative honeycomb catalyst (No. 1) had an ammonia concentration at the catalyst outlet of more than 30 ppm. As the temperature of the exhaust gas lowered, the denitration rate of the aforementioned comparative honeycomb catalyst (No. 1) decreased gradually, and dropped to a value of the order of 40% at the exhaust gas temperature of 200° C.

Based on the above findings, the honeycomb catalyst (No. 2) was found to be capable of restraining ammonia added to an exhaust gas from passing downstream of the honeycomb catalyst (No. 2).

As noted above, the present invention can decrease the concentration of $NO_X$ in an exhaust gas, and is useful when applied to the treatment of an exhaust gas from a gas turbine, a diesel engine, a gas engine, or a chemical plant such as a nitric acid plant, which undergoes great changes in load.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A catalyst for nitrogen oxide removal which catalytically reduces nitrogen oxides, in an exhaust gas having a ratio of nitrogen dioxide to the nitrogen oxides in said exhaust gas of 0.5 or higher, in presence of ammonia, comprising:
    a first component comprising an oxide of titanium, an oxide of tungsten, and an oxide of vanadium; and
    a second component comprising an oxide of manganese and an oxide of copper in equimolar amounts,
    wherein a proportion of the second component is 1.5 parts by weight or more but 4.5 parts by weight or less based on the first component.

2. The catalyst for nitrogen oxide removal according to claim 1, prepared by impregnating a base material comprising the first component with the second component and carrying the second component on the base material, drying, and then firing the base material impregnated with and bearing the second component.

3. The catalyst for nitrogen oxide removal according to claim 1, prepared by adding a solvent to the first component and the second component, kneading, drying, and then firing a resulting mixture.

4. The catalyst for nitrogen oxide removal according to claim 1, wherein proportions of the oxide of tungsten and the oxide of vanadium are 3 parts by weight or more, but 25 parts by weight or less, and 0.1 part by weight or more, but 6 parts by weight or less, respectively, per 100 parts by weight of the oxide of titanium.

5. An exhaust gas treatment method for removing nitrogen oxides contained in an exhaust gas, said method comprising:
bringing the exhaust gas, to which ammonia is added, into contact with a catalyst for nitrogen oxide removal comprising: a first component comprising an oxide of titanium, an oxide of tungsten, and an oxide of vanadium; and a second component comprising an oxide of manganese and an oxide of copper in equimolar amounts, wherein a proportion of the second component is 1.5 parts by weight or more but 4.5 parts by weight or less based on the first component, thereby reducing the nitrogen oxides, and,
when the ratio of nitrogen dioxide to the nitrogen oxides in said exhaust as becomes 0.5 or higher, increasing the amount of ammonia being added to the exhaust gas in order to change the $NH_3/NO_x$ ratio and to thereby decrease the $NO_x$ concentration at the outlet of the catalyst.

6. The exhaust gas treatment method according to claim 5, further comprising:
bringing the exhaust gas, which has passed through the catalyst for nitrogen oxide removal, into contact with a denitration catalyst, thereby further reducing the nitrogen oxides.

7. The exhaust gas treatment method according to claim 5, wherein the amount of ammonia added is increased when the $NO_2$ concentration in the exhaust gas is higher than the NO concentration therein.

8. The exhaust gas treatment method according to claim 7, wherein the $NH_3/NO_x$ ratio is 0.83 to 1.2.

9. The catalyst for nitrogen oxide removal according to claim 2, wherein said firing is conducted at a temperature of 400° C.

10. The catalyst for nitrogen oxide removal according to claim 3, wherein said firing is conducted at a temperature of 400° C.

* * * * *